United States Patent [19]

Jenkins

[11] Patent Number: 4,659,154
[45] Date of Patent: Apr. 21, 1987

[54] COMBINED HOBBY CABINET AND WORK BENCH

[76] Inventor: Jimmy R. Jenkins, 1814 Mayfield Ave., Garland, Tex. 75041

[21] Appl. No.: 647,702

[22] Filed: Sep. 6, 1984

[51] Int. Cl.⁴ ............................................. A47B 47/00
[52] U.S. Cl. ..................................... 312/277; 312/237; 312/290; 312/DIG. 33; 269/907
[58] Field of Search ................... 312/184, 257 A, 277, 312/293, 289, 290, 237, DIG. 33, 311, 138 A; 269/907; 248/231.7; 43/42.5

[56] References Cited

U.S. PATENT DOCUMENTS

| | | | |
|---|---|---|---|
| 1,984,345 | 12/1934 | Kennedy | 312/290 |
| 2,120,571 | 6/1938 | Reichstein | 269/907 |
| 2,247,593 | 7/1941 | Weber | 211/55 |
| 2,297,995 | 10/1942 | Wise | 312/311 |
| 2,730,423 | 1/1956 | Mock | 312/333 |
| 3,572,873 | 3/1971 | Harting | 312/290 |
| 3,730,738 | 5/1973 | Cook et al. | 312/184 |

Primary Examiner—Kenneth J. Dorner
Assistant Examiner—Joseph Falk
Attorney, Agent, or Firm—T. D. Copeland

[57] ABSTRACT

A combination universal hobby cabinet system, including a workbench, wherein the cooperative combination includes an organized storage cabinet having one member that is completely removable from the cabinet and then becomes a workbench which may be set on top of the closed cabinet or other flat surface to become a work station, and wherein the interior of the cabinet uniquely provides stowage space for materials and tools and for the workbench, all for use in the practice of particular hobbies, one embodiment of which system encompasses the hobby of fly-tying to create fishing lures.

3 Claims, 18 Drawing Figures

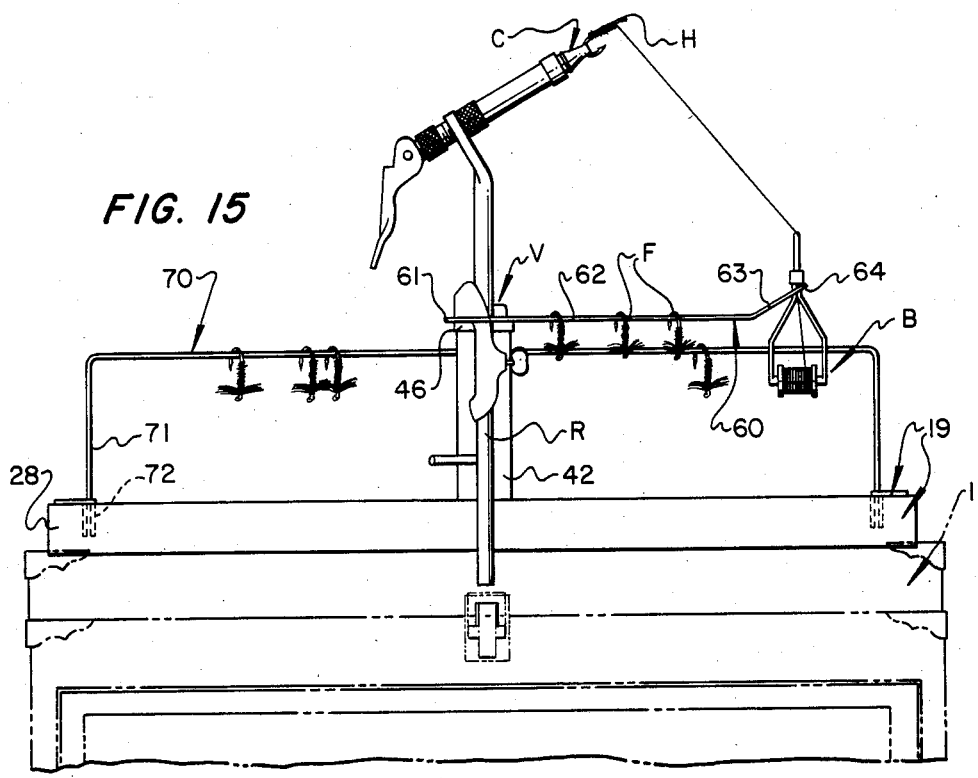
FIG. 15
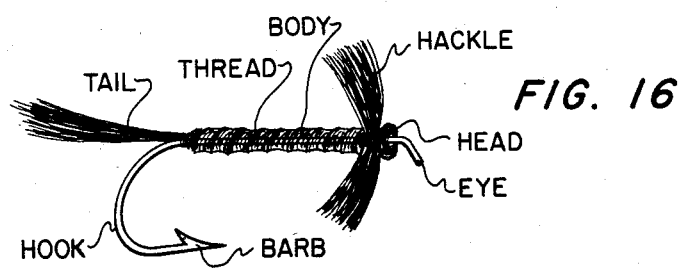
FIG. 16
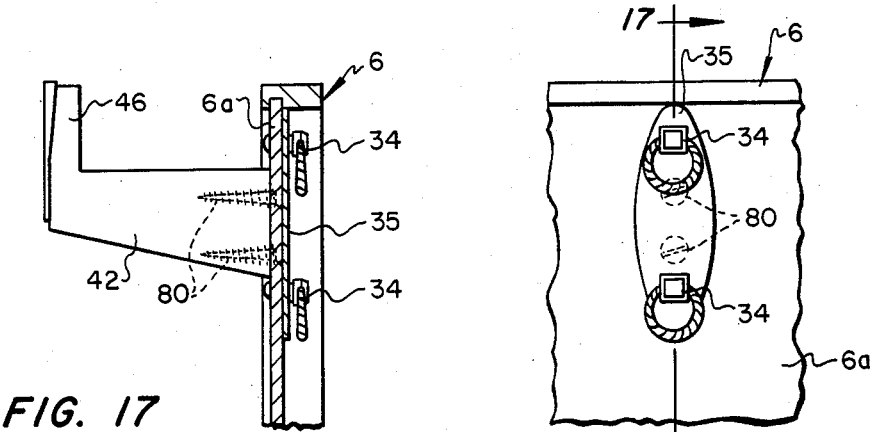
FIG. 17
FIG. 18

COMBINED HOBBY CABINET AND WORK BENCH

The subject matter of this application is also shown in my copending design application, filed of even date herewith, which application is incorporated herein by reference.

BACKGROUND OF THE INVENTION

While there are many extant storage cabinets, there are none directed to the particular hobby of the embodiment disclosed that so ably and uniquely handle the requirement of selective placement of hobby parts, materials, tools, and that simultaneously satisfy the need for a convenient and readily useable work bench that is necessary to practice this chosen hobby.

U.S. Pat. No. 3,168,363, to J. R. Monsour, for Artist's Kit is typical of the prior art in this field, wherein the artist's supplies are carried within the kit which resembles a brief case when closed but which may be opened and assembled to become an artist's station, with legs, easel, pallet, art supplies, etc. One side of the assembled kit becomes the easel which is locked in place at the desired angularity.

U.S. Pat. No. 3,701,576 to C. D. Moen, for Lap Supported Work Tray, shows the structure of a work tray with a drawer underneath that is supported in the operator's lap. The work tray surface slides away from the operator to expose the contents of the drawer.

U.S. Pat. No. 3,845,521, to D. H. McNichol, for Resilient Devices for Temporarily Binding and Gripping the Edge of Materials, shows a report cover gripping member that binds the edge of articles held in its jaws.

U.S. Pat. No. 4,332,060 to H. Sato, for Spring Clip for Holding Sheets of Paper or the Like, discloses another gripping means for holding articles.

U.S. Pat. No. 4,134,577 to E. A. Price, et al, for Fly-tying Vise that may be used with the work bench of this invention.

SUMMARY OF THE INVENTION

A principal object of this invention is to provide a convenient and organized storage facility for all of the various parts that are required to permit the user to successfully practice his or her hobby.

An additional object is to provide the combination of an organized storage facility and a work bench on which to implement the physical objects and materials utilized in practicing a particular hobby.

A still further object is to provide a portable, readily accessible and easily implemented facility where the various parts needed are instantly available and where the means to assemble or work on said parts is an integral part of the storage facility, per se.

And yet another object of one embodiment of the invention is to provide a portable combination storage facility and work bench particularly adapted to the art of "fly-tying", which hobby is intimately inter-woven into the sport of "fly-fishing."

A primary object is to provide a universal hobby work station system, wherein most of the hobbies that involve manual crafts are ideally suited to be practiced directly from the the work station system of this invention. While the use of vertical files is common in keeping office records, the concept requires substantial modification to provide the particular adaptation to permit such a system to be employed in equipping a hobby work station. Hobbies directly suited to be accommodated by the disclosure herein, include: fly-tying for making fish lures; leathercraft for creating and decorating leather articles; beadcraft; sewing and needlework; photography; woodcarving; pistol lore; porcelian painting; and candlemaking.

BRIEF DESCRIPTION OF THE DRAWING

For a more complete understanding of the invention, and for further objects and advantages thereof, reference is made to the following description, taken in conjunction with the following drawings, in which:

FIG. 15 is a front elevational view of the front panel when in use as a workbench.

FIG. 16 is a fragmentary cross sectional view taken along the lines 17—17 of FIG. 18; and FIG. 18 is a fragmentary detail view of the front plate and handles of the device of FIG. 1.

DESCRIPTION OF THE PREFERRED EMBODIMENT

Figures 1, 2:
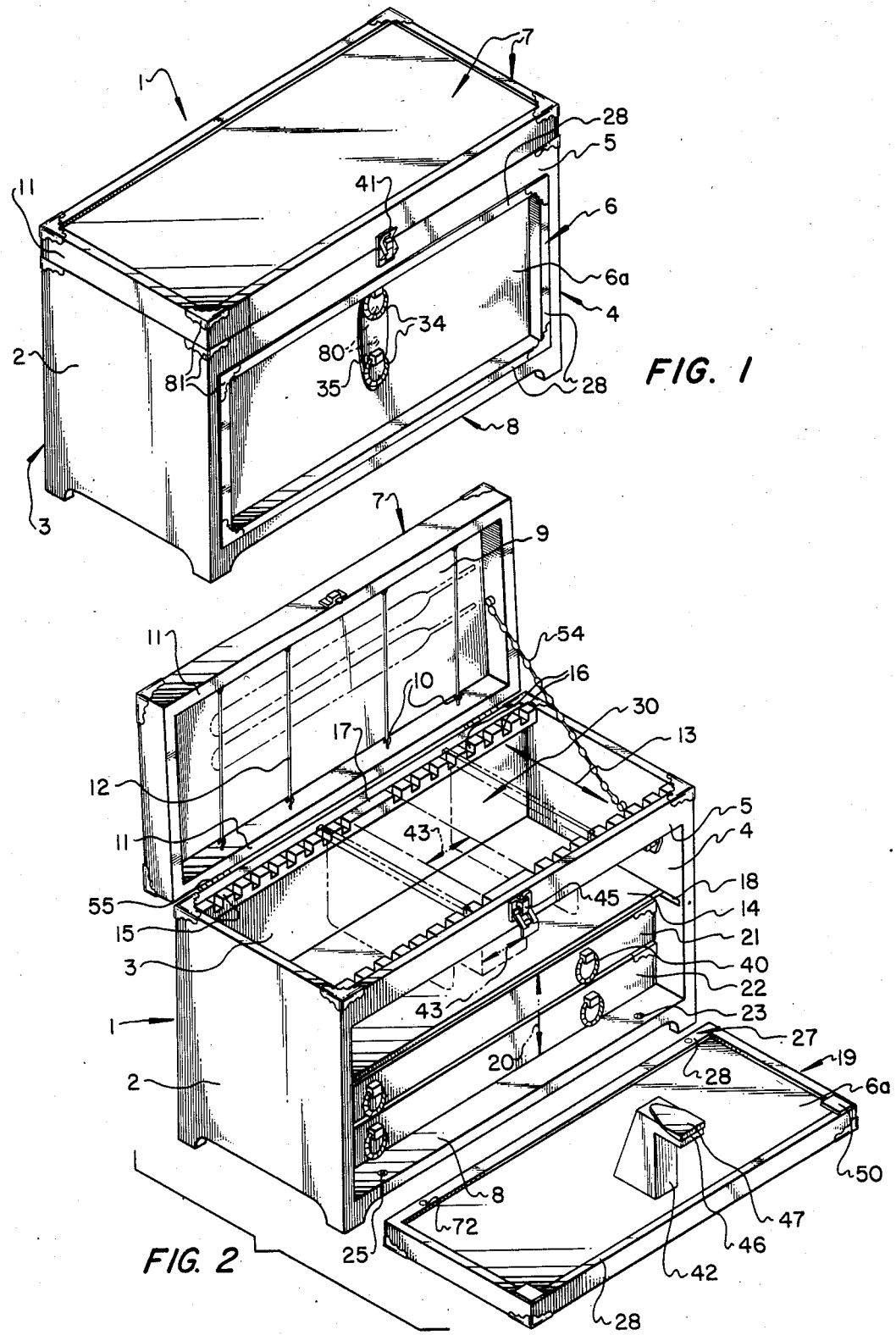
FIG. 1 is a perspective view of the hobby cabinet of this invention in a closed or stowed condition.
FIG. 2 is a perspective view, similar to that of FIG. 1, but in an open or "in use" condition.

Referring now more particularly to the characters of reference in the drawing, it will be observed that in FIG. 1, the external appearance of the hobby cabinet 1 of this invention includes four vertical sidewalls 2-5, one of which, 5, includes a removable front panel member 6, plus a hinged top member 7 and a solid bottom member 8. The location of members not directly visible in FIG. 1 are indicated by curved arrows, and are shown clearly in other figures of the drawing, using the same reference numbers.

The internal configuration of the cabinet 1 is seen in large measure in FIGS. 2-4, 7 & 9, wherein the top member 7, when shown in its fully open position in FIG. 2, reveals an indented compartment 9, that is adapted to hold long feathers or other materials too large for the other storage compartments within the cabinet. To hold such articles, which are usually contained in plastic bags, a series of "cup hooks" 10 have been installed at aligned positions on the top panel trim 11, so that elastic bands 12 may extend between the hooks 10 and secure the contents of compartment 9.

Figure 3:
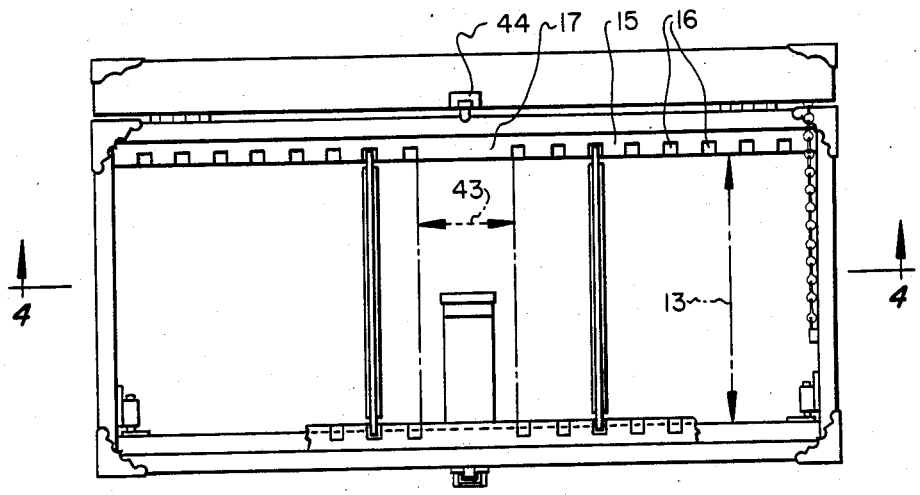
FIG. 3 is a top plan view of the cabinet as shown in FIG. 2.

The principal storage compartment, however, identified at 13 is the upper part of the cabinet located between the top panel compartment 9 and the horizontal partition 14. A pair of parallel strips 15 including a series of parallel notches 16 are located at an inner top position in compartment 13 as seen in FIG. 3. The middle portion 17 of each strip 15 is free of notches for a reason described hereafter. The partition 14 may be installed permanently or removable as desired, in which case, parallel slots 18 would be made in the side walls 2 and 4 at the required locations. This partition 14 acts as a bottom for top compartment 13, and as a top for drawer compartment 20, as well as a protective cover for the contents of the top drawer 21, which itself acts as the protective cover for the bottom drawer 22. The forward portion of the bottom frame member 8 includes a pair of latch wells 23 (also seen in FIG. 8) which contain a spring 24 that engages ball 25, which in turn engages an indentation 26 in the bottom side 27 of the lower frame portion of trim 28 of front panel member 6, when the front panel member is fully installed into cabinet 1. The locations of the balls 25 and their wells 23, may be selectively interchanged with the locations of the indentations 26.

The top compartment 13 is thus adapted to receive a plurality of vertical files 30 that hang vertically from the notches 16 and terminate above the bottom partition 14. These vertical files 30, seen in detail in FIGS. 5 & 6, comprise a transparent plastic material bag 31, which is closed at its normally open top end by cover rod 32. The cover rods 32 are usually of a plastic material that is biased toward a closed position as seen in FIG. 6 whereat it clamps against the top open end of the clear plastic bag 31, and forms a seal until the file 30 is removed from its suspended position in notch 16 in cabinet 1, and the cover rod 32 is removed from bag 31 to provide access to the bag contents. Notwithstanding the serrations 33 at the bottom inner side of rod cover 32, the rod may still be slid off of its closure position on bag 31 by a small amount of lateral manual pressure. The construction of the cabinet 1, with its removable front panel 6 and its hinged top 7, provides instant visible access to all of the vertical files 30, including instant visibility as to the contents of the bags 31, even when in their installed position in compartment 13. As a further aid to rapid classification of the contents, the rods 32 are color-coded in bright colors, which makes the work place more appealing as well as more efficient.

The peripherial trim 28 of the front panel member 6 extends beyond the outer surface of the front panel 6a for a distance greater than the dimension in the same direction of the front panel handles 34 and their mounting plate 35. This construction permits the front outermost plane of the member 6 to be laid flat on any uniform horizontal surface without interference from the handles 34 or any other parts. Further, it may be placed on top of the closed cabinet 1, with the same results.

Figure 12:
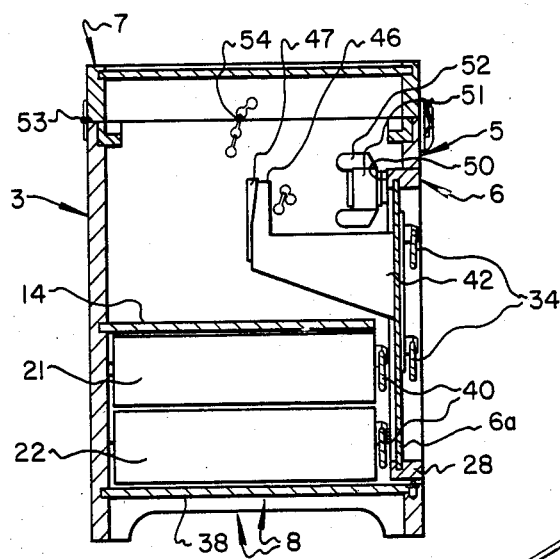
FIG. 12 is a view similar to FIGS. 10 & 11 with the front panel member in its closed position.

The removable drawers 21 and 22 may include divided compartments (not shown), and may slide one against the other or on the partitions 37 & 38, or on guides 39 as desired. Each drawer includes ring type handles 40, similar to the handles 34; and the drawers, when fully closed, are set back from the front panel 6a a sufficient distance whereby no interference is encountered between the handles and the back side of front panel 6a. The drawers are also located below the location of the pedestal 42, when the front panel member 6 is in its closed position, as shown in FIG. 12. In fact, the area indicated by arrow 43 in FIG. 2 is dedicated for the reception of pedestal 42, and does not include any material or projections or even any notches 16 that would permit any material to interfere with such dedication.

Figure 8:
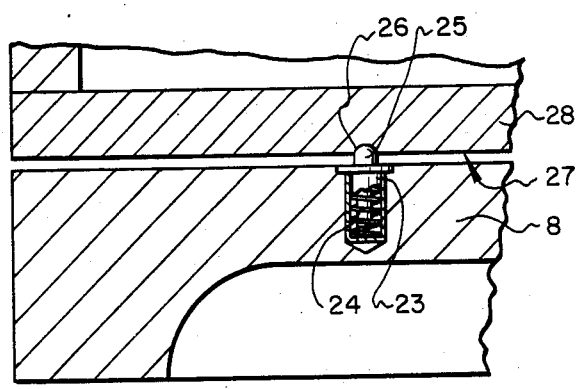
FIG. 8 is an enlarged fragmented cross section taken along the lines 8—8 of FIG. 7.
Figure 9:
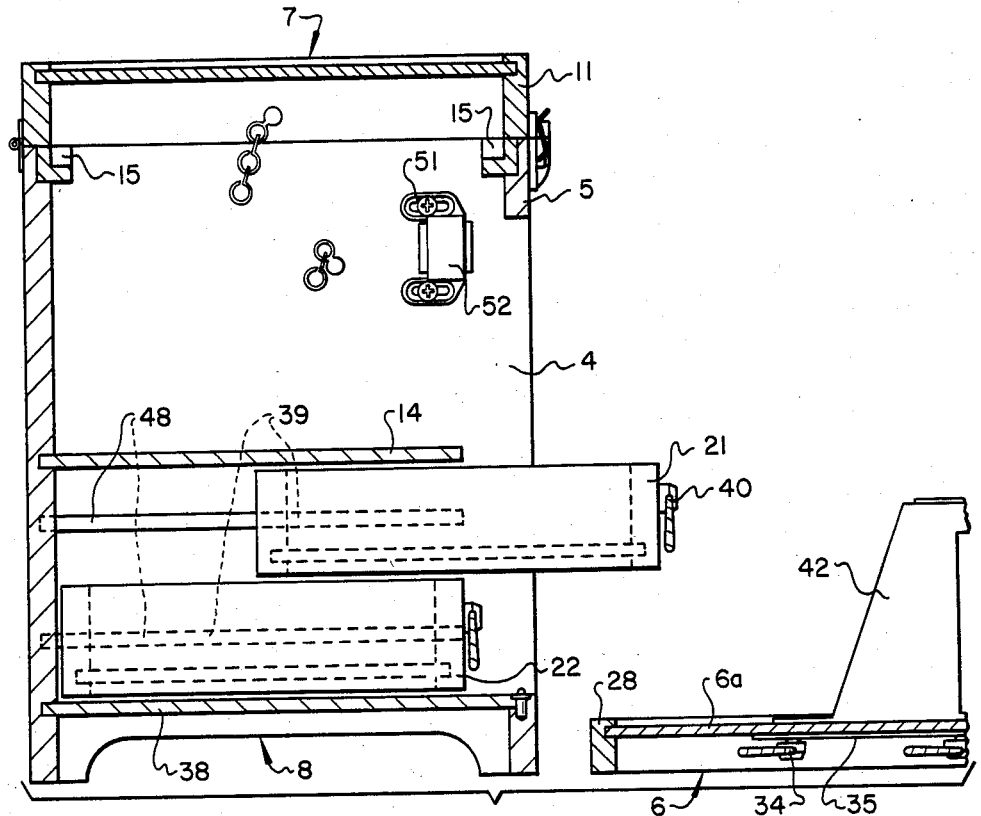
FIG. 9 is a cross section taken along the lines 9—9 of FIG. 4 and showing the front panel removed and one drawer in use.
Figures 10, 11:
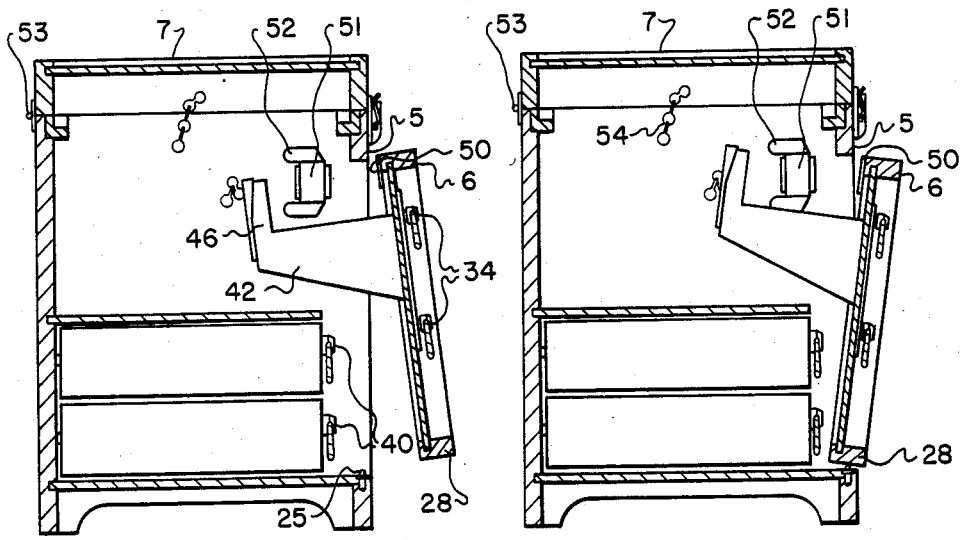
FIG. 10 is a partly exploded view in cross section showing the front panel member at the first step in its closure into the cabinet.
FIG. 11 is a view similar to FIG. 10 with the front panel member at the second step in its closing procedure.

A conventional closing hasp 41, with parts 44 and 45 on the top and front members respectfully, latches the front panel member 6 to the rest of the cabinet after the installation procedure as shown in FIGS. 10-12 is followed. FIG. 10 shows the front panel member 6 including pedestal 42 being leaned downward to permit the free end 46 of the pedestal to clear the top frame member of the front member 5 without the requirement of precise alignment, and without interference when the free end is made selectively longer than the outline dimensions of pnale 6. When the pedestal has cleared the front member 5, and is in the dedicated compartment 43 in the interior of cabinet 1, the lower trim 28 of the front panel member 6 is forced over the latch balls 25 until the balls first depress into their latch wells 23, and then expand into detents 26 on the bottom of trim 28, as seen in FIG. 8. The upper frame trim 28 then slides easily into place and alignment under the top section of front member 5 to the position shown in FIGS. 11 & 12, at the time front panel member 6 is completely closed into the opening in front wall 5, the small metal plate 50 engages the magnet 51 in magnet holder 52 to further secure the closing operation. Top member 7 is hinged at 53 to back wall 3, and secured against back fall by chain 54.

When both the front and top of cabinet 1 are opened up, as in FIG. 2, the operator may easily view the vertical file compartment 13 and all of the transparent parts bags (containing feathers) from either the top or front, so that he may visually determine which bag he needs without the requirement that he lift out and examine each bag separately. When the operator has made this determination, he removes the bags he needs by lifting the bag cover rod 32 together with its attached bag 31 up vertically thru the open top of cabinet 1. The bag 31 and its contents will not slip out of rod 32 during this lifting operation because of the serrations 33 described before with reference to FIG. 6. When the selected bag files 30 have been removed, the operator closes the top cover 7 and latches it thru the hasp 41. He is then able to place the work bench 19, which is the reverse side of front panel member 6, onto the top cover 7, or onto his lap, or onto any smooth flat surface, and is ready to begin work.

The hobby cabinet 1, in this embodiment, is to be used by a fly-tying enthusiast. Fly-tying is an ancient hobby, which has been practiced for thousands of years, and each hobbyist likes to make his own variety of lure, and the greatest satisfaction comes when fishing success is achieved by the craftsman using a lure which he has tied or created himself. The term "fly-tying" is generic to the art of starting with a bare fish hook and adding to it with feathers, wool, hair, floss, tinsel, et al, and affixing such materials to the hook in a specified order, using thread, silk, was and glue to produce a specimen that appears to be live bait (to a trout), which specimen called "patterns" are identified in various categories of live bait, and called: "dry-flies, wet-flies, nymphs, streamers and bucktails". Each of these categories have several varieties known by their exotic names (sometimes that of their creator) of "Deren's Fox, Brown Hackle, Little Marryat, Royal Coachman and Mickey Finn". FIG. 16 shows one such lure which is made using one type of feathers for its protruding tail which extends beyond the barb of the hook, and other materials that are attached by thread and glue to produce the finished product of the lure shown.

Figure 13:
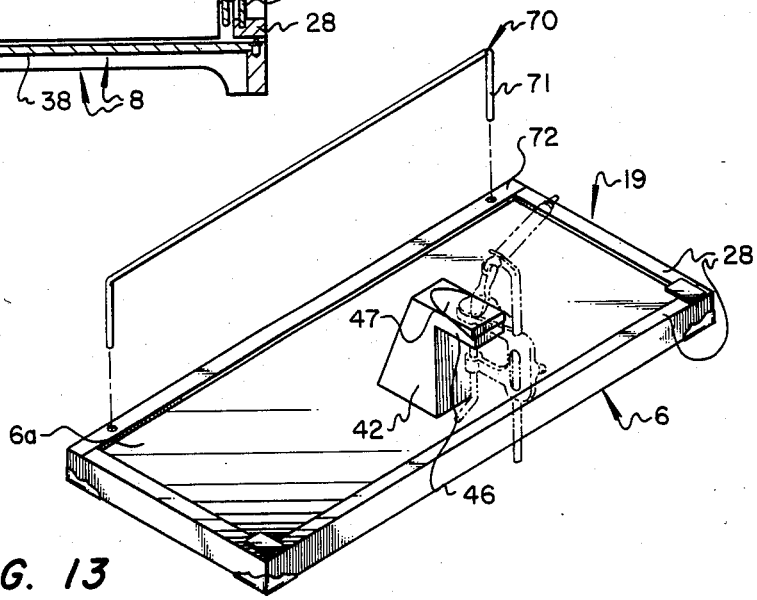
FIG. 13 is a perspective view of the front panel member in its removed and inverted position relative to the cabinet, and showing the work bench in operation.
Figure 14:
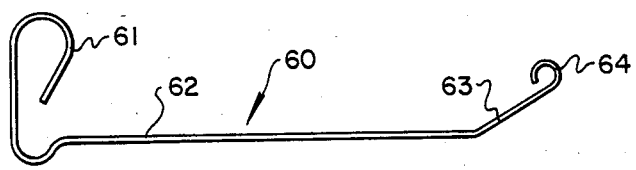
FIG. 14 is a detail view of an extension member used to hold a thread bobbin away from the vice jaw (chuck) area.

To practice this art using the workbench 19 of this cabinet 1, a commercially available vise V is attached to the protruding portion 46 of the pedestal 42 in such a manner that the long vertical adjusting rod R clears the workbench and the cabinet or table on which the workbench is located. FIG. 15 shows the workbench 19 in use with the addition of a unique bobbin holder 60 (shown in detail in FIG. 14), which includes a large loop 61 at the mounted end, a long horizontal shank 62, and an upward extending end portion 63 that terminates in a small loop 64. With the bobbin holder 60 installed and a thread bobbin B suspended therefrom and the fish hook firmly held in the chuck, the hobbyist is ready to proceed with the fly-tying operation. He may start by first applying a light coat of laquer or vinyl glue to the shank of the hook, and then wrapping a few turns of thread from the bobbin around the shank and a set of tail feathers in such a manner as to extend the tail feathers beyond the barb of the hook, and then wrapping more thread over the feathers and the shank, and then adding more glue and some wool to form the body, and adding more feathers to form wings and the hackle for legs and adding other parts if desired, but terminating in a buil up of wound thread in the area of the hook eye to form the artificial insect's head, all as shown in FIG. 16. It is essential in the interest of good workmanship to keep the bobbin B at a distance from the chuck C and the vise V, and to keep it freely spinning. This is accomplished by the construction shown in FIG. 15. An additional advantage to the use of this bobbin holder 60 is that the long horizontal portion 62 may be used to hang newly finished flies F for drying, as seen in FIG. 15. If additional drying capacity is needed, a U-shaped drying rack 70 is provided by inserting the free ends 71 of this rack into holes 72 in the trim 28 of the workbench, as seen in FIGS. 13 & 15.

Figure 4:
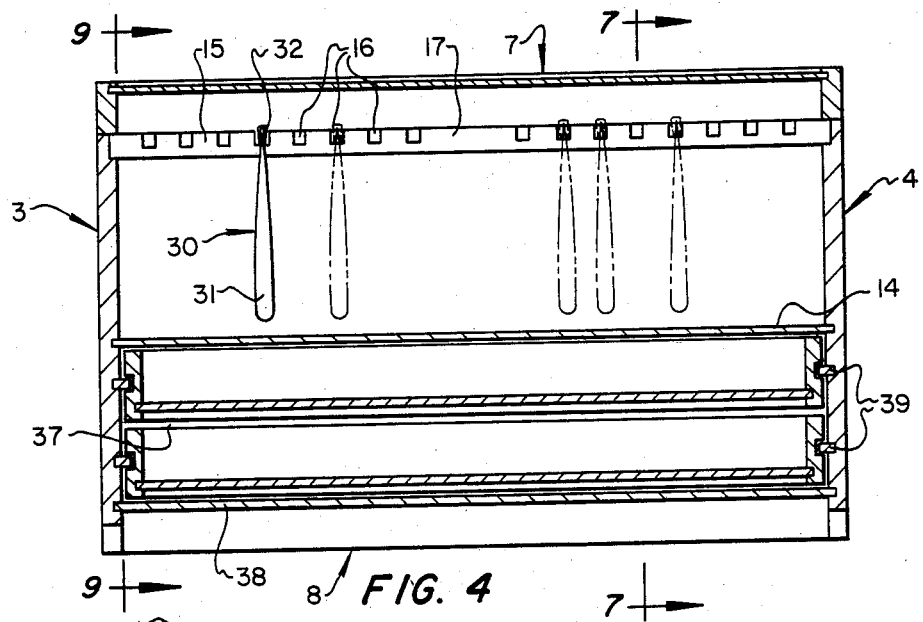
FIG. 4 is a front elevational view of the cabinet as shown in FIG. 2, with certain members removed for clarity of illustration.
Figure 5:
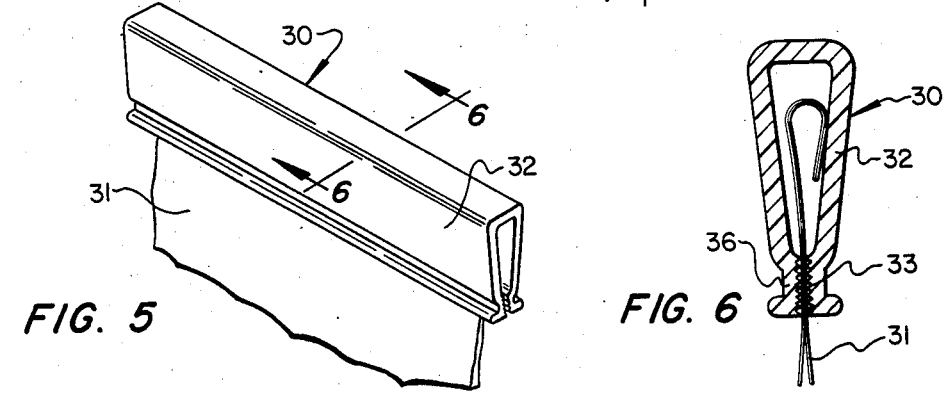
FIG. 5 is a detail fragmentary view of one of the article holding bags used herein.
Figure 6:
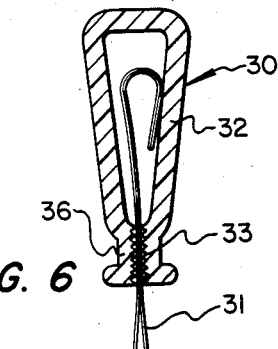
FIG. 6 is a cross section taken along lines 6—6 of FIG. 5.
Figure 7:
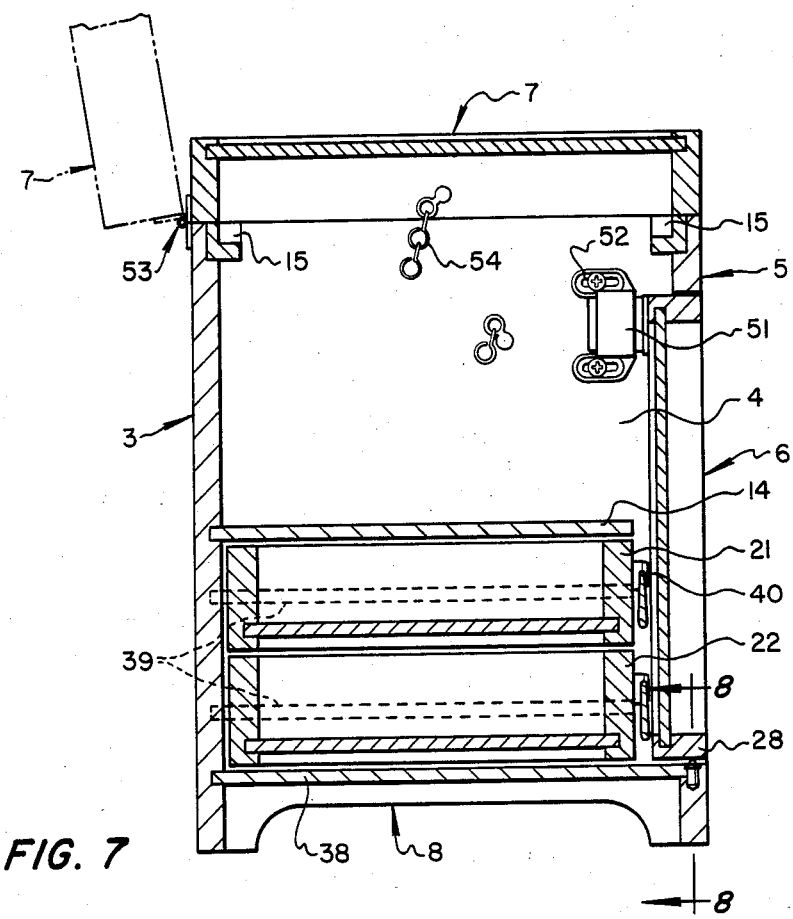
FIG. 7 is a cross section taken along the lines 7—7 of FIG. 4.

In the construction of the vertical files 30, as seen in FIGS. 4, 5 & 6, it will be noted that the transparent plastic parts bag 31 is held in and sealed by plastic cover rods 30. Up to this point, this assemblage is similar to a student's report cover, except that the latter is open at three sides to begin with, and open at two sides when completely assembled; and the report cover rod is coextensive with the transparent sheets. Here, however, the cover sheets are replaced by a transparent self-sealing bag of precise dimensions to utilize the space provided in compartment 13. The bag 13 is open temporarily and only at the top to begin with, and then is completely sealed before insertion into its cover rod 32, which securely holds the bag, and which itself extends a distance beyond each end of the bag so that the extended portion of the rod provides the holding means by which the bags are suspended from the U-shaped notches 16 in strips 17 at the upper end of the vertical file compartment 13. Another distinction is seen in the lower leg portions 36, which include horizontally extending serrations 33 on their inner sides, and outwardly extending feet 36a on their outer sides. These feet permit the cover rod to seat firmly in the flat bottom of the U-shaped notches 16, so that the vertical files 30 do not rock sideways in use, but have a firm footing. This construction permits the biased legs 32 to forceably grip the upper end of the plastic bag 31 and prevent the bag from falling or being pulled from its held position. However, when the operator wishes to remove the cover rod and expose the contents of bag 31, it is required that he pull the rod 32 in a horizontal direction only, so that the horizontally parallel serrations 33 will permit such a result and release from the bag.

FIG. 17 shows a fragmentary cross section taken along the lines 17—17 of FIG. 18, to show the attachment of the pedestal 42 by countersunk screws 80 to the back of panel 6a. Plate 35 is attached to the upper area of panel 6a at a position directly over the countersunk heads of screws 80, so that the brass plate 35 fits flush against the outer face of member 6a, and whereby the unattractive screw heads are hidden from view, as shown in FIG. 18 and FIG. 1.

Each exposed outer corner of the cabinet 1 is protected by an attractive brass colored metal guard 81 for the sake of appearance and for the extended life of the cabinet that may be subject to substantial use.

An additional advantage not readily discernible from an observation of the cover rod 32 is that the feet 36a, in addition to providing a firm flat footing for support of the vertical file 30 also provide added strength to the long flexible rod 32 to accommodate rough handling by the operator and to extend the operating life of file 30.

Altho the embodiment of FIG. 1 shows a center section of the strip 15 to be devoid of notches in the area identified at 43, in practice, at times it may be desirable to include a full complement of notches 16 for full utility or ease of manufacture.

The pedestal (or horn) 42 is shown affixed to the workbench 19 whereas certain hobby practice may make it desirable to permit said horn to be omitted, or easily removed. This can be accomplished by using parallel rails, similar to the construction employed in the installation of drawers 21 and 22 by means of guides 39, or other known installation techniques.

Whereas the present invention has been described with respect to a specified embodiment, it will be understood that various changes and modifications will be suggested to one skilled in the art, and it is intended to encompass such changes and modifications as fall within the scope of the following claims.

What is claimed is:

1. A combination product of a storage cabinet and a workbench having a removable front panel member, comprising:
   a. a swivel handle on the front side of said panel member,
   b. a raised peripherial trim on each side of said panel member,
   c. said trim on the front side of said panel member being of sufficient height to permit said swivel handle to fold down below its height so that the front side may lay flat on a flat surface,
   d. said trim on the back side of said panel member being of sufficient height to prevent small objects from rolling off said surface and to permit tools to lay in part on said trim and in part on said back surface for easy pick up, and
   e. a workbench pedestal upstanding from said back side and in alignment with said swivel handle, and f. said pedestal being so configured as to support a vise without interference with said flat surface when in use and without interference with the contents of said storage cabinet when in its stowed condition in said storage cabinet.

2. A combination product comprising:
a. a cabinet having a plurality of sides,
b. one side representing the front including a removable front panel member,
c. said front panel member comprising a front having a swivel handle, a handle supporting plate, and a peripheral trim on the front side of said panel member,
d. said trim on the front side of said panel member being of sufficient height to permit said swivel handle to fold down below its height so that the front side may lay flat on a flat surface,
e. a vise supporting pedestal on the opposite side of said panel member and in alignment with said plate,
f. means for attaching said pedestal to said front panel member that would normally be visible from the front of said cabinet but that is effectively masked by said plate,
g. a second trim near the top interior of said cabinet having a plurality of parallel and aligned notches on each cabinet side except in a dedicated area reserved for stowage of said pedestal when said cabinet is closed, and wherein
h. that portion of said second trim that is mounted to the top interior of the cabinet is mounted above the top of the removable panel, whereby when the front panel member is removed from the cabinet, the contents of the entire upper area of the cabinet are visible thru a window left by removal of said panel member from the front of the cabinet, and
i. the contents of said area comprising a plurality of transparent vertical files having an extended sealing rod cover extending beyond the ends of the files and tightly sealing in the contents of said files, and resting in said notches.

3. A universal hobby workstation system comprising in combination:
a. a cabinet having a plurality of sides,
b. a workbench integral with and removable from one of said sides to form a workstation,
c. a plurality of vertical files stored within said cabinet, comprising transparent bags, the contents of which become instantly visible and accessible upon removal of said workbench from said cabinet,
d. means to suspend said bags in such a manner that their contents are discernible without removal from their stored position,
e. a workbench pedestal upstanding from the inner side of said workbench which comprises a parts retaining work area, and the outer side of which comprises an attractive cabinet exterior finish, and
f. means permitting said workbench to lay flat on a flat surface;
g. said pedestal being so configured as to support a vise without interference with the outer side of said workbench when in use, and without interference with the contents of said cabinet when said workbench is in its stored position within said cabinet,
h. a vise for installation on said pedestal at a position above the plane of the workbench by the height of said pedestal,
i. said vertical files defining a dedicated space and including cover rods with mounting feet adapted to tightly seal said bags and to align said bags in a manner to permit instant access to the contents of each bag, and wherein the arrangement of said bags in said files being such as to provide immediate ingress and egress of said pedestal into and from its stowed position in said dedicated space.

* * * * *